United States Patent [19]
Marcuse et al.

[11] Patent Number: 5,699,464
[45] Date of Patent: Dec. 16, 1997

[54] LENS STRUCTURE FOR FOCUSING THE LIGHT EMITTED BY A MULTIMODE FIBER

[75] Inventors: Dietrich Marcuse, Lincroft; Herman Melvin Presby, Highland Park, both of N.J.

[73] Assignee: Lucent Technologies Inc., Murray Hill, N.J.

[21] Appl. No.: 647,604

[22] Filed: May 13, 1996

[51] Int. Cl.$^6$ .................................................. G02B 6/32
[52] U.S. Cl. .................. 385/33; 385/31; 385/34; 385/35
[58] Field of Search ................. 385/33, 34, 35, 385/31

[56] References Cited

U.S. PATENT DOCUMENTS

| | | | |
|---|---|---|---|
| 4,456,330 | 6/1984 | Bliidaii | 385/33 X |
| 4,784,466 | 11/1988 | Khoe et al. | 385/33 |

OTHER PUBLICATIONS

"Ideal Microlenses for Laser to Fiber Coupling" by C.A. Edwards et al., Journal of Lightwave Technology, vol. 11, No. 2, Feb. 1993, pp. 252–257.

"Intergration–Oriented lensed fibers having working distances and wide tolerances" by K. Shiraishi et al., OFC '96 Digest, pp. 245–246 vol. 2.

"Coupling of Spherical–surfaced LED and spherical–ended fiber" by O. Hasegawa et al., J. Appl. Phys., vol. 51, No. 1, pp. 30–36, Jan. 1980.

Primary Examiner—Phan T. H. Palmer

[57] ABSTRACT

Efficient coupling between multimode optical fibers and optical devices, such as optical detectors and light emitting diodes, is realized by means of a coupling arrangement comprising a length of homogeneous glass fiber, terminated by a convex microlens. One end of the glass, whose length is greater than the focal length of the microlens, is fusion-spliced to the multimode fiber. The convex microlens is formed at the other end of the homogeneous glass member.

5 Claims, 2 Drawing Sheets

LENS STRUCTURE FOR FOCUSING THE LIGHT EMITTED BY A MULTIMODE FIBER

TECHNICAL FIELD

The present invention relates to a lens structure for focusing the light emitted by a multimode fiber so as to obtain efficient coupling between integrated optical devices and multimode optical fibers.

BACKGROUND OF THE INVENTION

The development of low-loss, low dispersion single mode optical fibers has made possible the design and installation of extremely high capacity transmission systems. However, in order to take full advantage of such fibers, efficient techniques for coupling between fibers and optical devices, such as optical detectors and semiconductor lasers, also had to be developed. As an example, maximum power transfer between devices and fibers is critical in long distance transmission systems where increased signal power permits longer spans between repeaters, and in fiber amplifier systems where even small increases in pump power can significantly increase signal gain.

To achieve more efficient coupling between single mode fibers and optical devices, microlenses are used. See, for example, the article by C. A. Edwards et al., entitled "Ideal Microlenses for Laser to Fiber Coupling," published in the Journal of Lightwave Technology, Vol. 11, No. 2, February 1993, pp. 252–257. As explained in the above-identified article, compared to butt coupling, efficiency is improved either by the use of a microlens at the end of the fiber or by the use of bulk optics. In such applications, however, microlenses are more commonly used because of ease of fabrication and packaging.

In addition to single mode systems, there are also applications that do not require either transmission over long distances, or very high information capacity. In such cases, multimode optical systems are adequate. This permits the use of larger core fibers which, in turn, reduces losses due to axial or lateral misalignment of joined fibers in the system. A problem with multimode systems, however, is that the simple, single microlens used in single mode systems to increase coupling efficiency cannot be used by itself in a multimode system. A single lens, placed at the end of a multimode fiber, cannot serve as the focusing member for a multimode signal due to the proximity of the lens to the fiber core, which serves as the object. What is needed is a mechanism which serves both to place the object at a point beyond the focal point of the focusing lens and, at the same time, serves to collect as much of the incident wave energy as possible. As will be explained in greater detail herein below, a multimode microlens coupler requires the equivalent of two lenses for efficient coupling. One such arrangement is described in an article entitled "Coupling of spherical-surfaced LED and spherical-ended fiber" by O. Hasegawa et al., published in the J. Appl. Phys., Vol. 51, No. 1, pp. 30–36, January 1980. However, the resulting coupler had a very low coupling efficiency.

It is, accordingly, the broad object of the present invention to couple multi-mode wave energy efficiently between multimode fibers and optical devices. It is a more specific object of the invention to achieve such efficient coupling with a lens arrangement that is easy to fabricate and package.

SUMMARY OF THE INVENTION

Efficient, easily fabricated and packageable multimode optical couplers are realized, in accordance with the invention, by the inclusion of a length of uniform material, such as silica, on to the end of the multimode fiber, and then forming a microlens on the end of the silica spacer. As will be explained hereinbelow, by selecting the appropriate length of material, higher coupling efficiencies between multimode fibers and optical devices can be realized.

DETAILED DESCRIPTION

Figure 1:
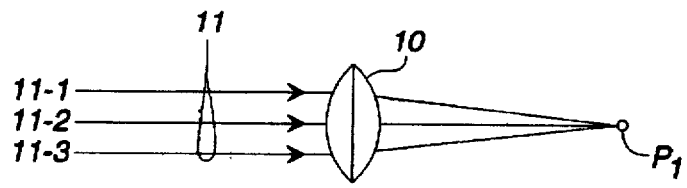
FIG. 1 illustrates the prior art use of a bulk convex lens to focus a beam of single mode light.
Figure 2:
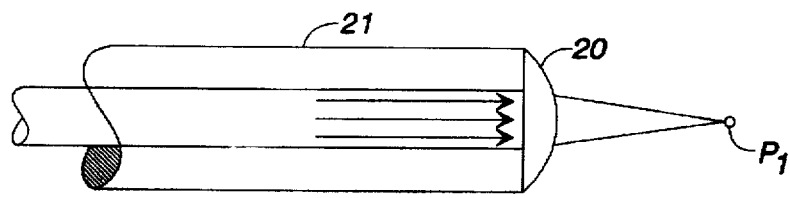
FIG. 2 shows the prior art use of a simple microlens to focus a beam of single mode light.

Referring to the drawings, FIG. 1 illustrates the use of a bulk convex lens 10 to focus a beam 11 of parallel light rays 11-1, 11-2, 11-3 at a common point $P_1$. The equivalent of such an arrangement can be utilized to couple single mode optical wave energy into and out of single mode optical fibers. In a typical optical arrangement, as shown in FIG. 2, a microlens 20 is formed at the end of a fiber 21 for this purpose. (See, for example, the above-cited article by C. A. Edwards et al..) Because the optical wave propagates along the fiber in a single mode, the rays incident upon lens 20 are parallel to each other, and are focused by the lens at its focal point $P_1$. It would appear from the above that a similar arrangement of fiber and lens could be used in the case of a multimode system. However, as noted above, a more complicated lens system is required or the efficiency of the light transfer is significantly reduced. The problem can be illustrated with reference to FIGS. 3, 4, 5 and 6.

Figure 3:
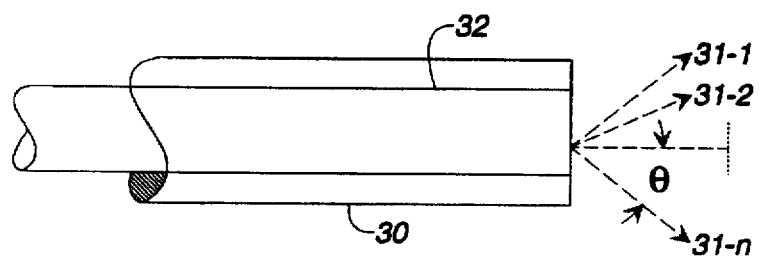
FIG. 3 shows the ray directions of light emitted at the end of a multimode optical fiber in accordance with the prior art.
Figure 4:
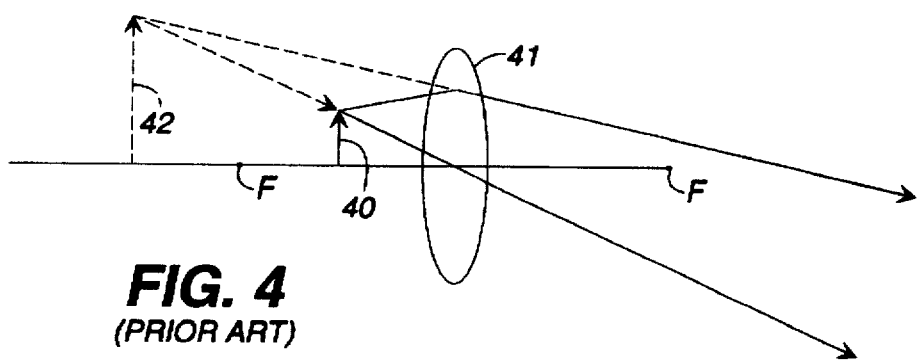
FIG. 4 shows the prior art formation of a virtual image when an object is placed between a convex lens and its focal point.
Figure 5:
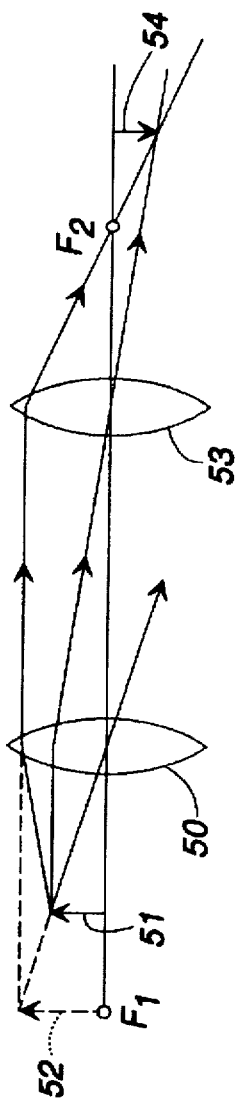
FIG. 5 shows the prior art use of a second convex lens to form a real image using a virtual image as the object.

In a multimode system, illustrated in FIG. 3, the rays propagating along the fiber are no longer parallel. Hence, at the end of the multimode fiber 30, the rays 31-1, 31-2, . . . 31-n, are emitted from the core 32 as a diverging beam whose maximum cone angle θ is a function of the numerical aperture (NA) of the fiber. Advantageously, any lens placed at the end of the fiber to focus the rays should be placed directly over the fiber core in order to capture all the signal energy. However, in doing so, the object (i.e., the end of the fiber core) would be located between the lens and its focal point. This is illustrated in FIG. 4, which shows an object 40 located between a bulk lens 41 and its focal point F. As can be seen, when the object is between the focal point F and a convex lens, the resulting image 42 produced is virtual and erect. In order to obtain a real image, a second convex lens must be added. As illustrated in FIG. 5, with the object 51 located between the first lens 50 and its focal point $F_1$, a virtual image 52 is formed, as illustrated in FIG. 5. The latter, in turn, can serve as the object for a second lens 53 to form a real image 54.

Figure 6:
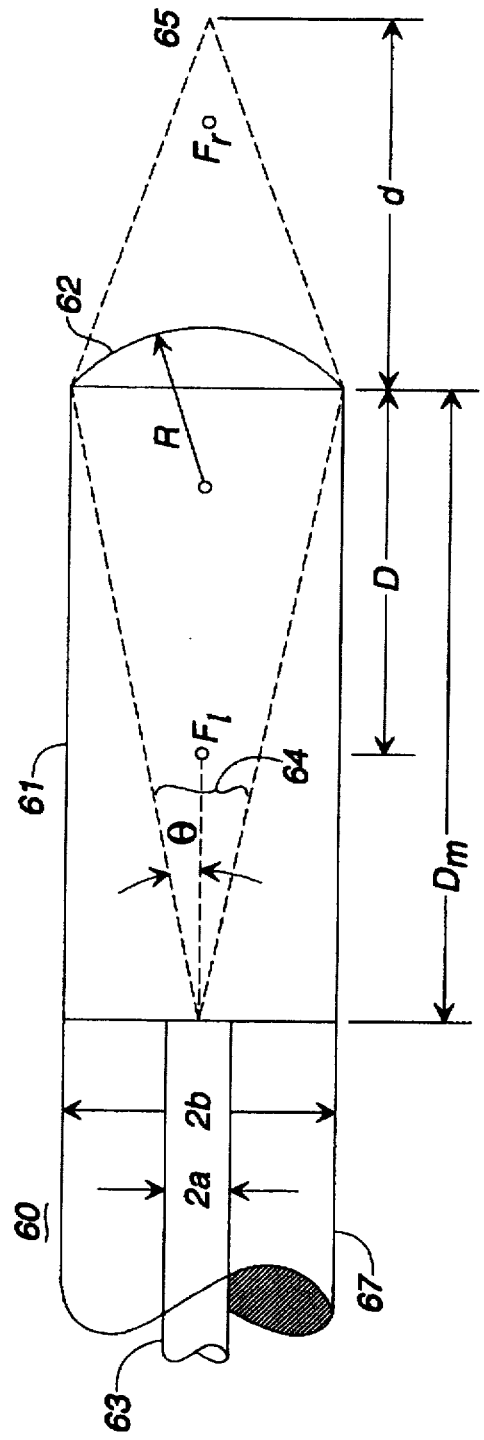
FIG. 6 shows a coupler, in accordance with the present invention, using a length of homogeneous glass as a spacer between a multimode fiber and a convex microlens.

While physically realizable, a coupling structure using two bulk lenses or two microlenses would be, at best, inconvenient. A more packageable and more efficient coupling arrangement, in accordance with the present invention, employs a single microlens separated from the multimode fiber by a length of glass. As illustrated in FIG. 6, a multimode fiber 60 is terminated by fusion splicing a length of homogeneous glass 61 onto the end of the fiber, and forming a lens 62 on the other end of the glass in the conventional manner.

The insertion of a length of homogeneous glass between the multimode fiber and the lens serves two functions simultaneously. First, it moves the object (i.e., the end of the fiber) away from the lens 62 thus permitting the lens to form a real image. Secondly, it provides a means for capturing substantially all of the optical energy emitted by the fiber and focusing it at a point.

The rays, as shown in FIG. 6, are emitted from the fiber core 63 within a cone 64 whose apex angle $\theta$ is a function of the numerical aperture $(NA)_f$ of the fiber. Specifically $$(NA)_f = n_c \sin \theta \quad (1)$$

where $\theta$ is the largest angle at which rays can travel inside a fiber core of refractive index $n_c$.

To realize the first of the above-stated objectives, the spacer must extend beyond the left focal point of $F_l$ of lens 62. The latter, it will be noted, has two focal points $F_l$ and $F_r$. One point, $F_l$ (referred to hereinabove as the left focal point), is the focal point within the spacer 61 for parallel rays incident from the right and traveling toward the spacer.

The second focal point, $F_r$, is outside the spacer, and is the focal point for parallel rays traveling through the lens from left to right. These are given by $$F_l = nR/(n-n_o) \quad (2)$$

and $$F_r = n_o R/(n-n_o), \quad (3)$$

where

R is the radius of the curvature of the curved surface of the lens;

$n_o$ is the index of refraction of the region in which the image is formed; and n is the index of refraction of the spacer material.

As explained hereinabove, if an object is located between a convex lens and its focal point, a virtual image is formed. To form a real image, the length D of the spacer must be greater than $F_l$.

To realize the second objective, i.e., to capture as much of the emitted energy as possible, the cone of rays should not extend beyond the lens surface. If the cone does extend beyond the lens surface, rays not intercepted by the lens will be lost. In addition, some of the rays will impinge upon the cylindrical surface of the spacer and be reflected internally. This would distort and enlarge the image.

Referring to FIG. 6, it can be seen that the cone will not extend beyond lens 62 for a range of values of D up to a maximum value $$D_m = n(b-a)/(NA)_f \quad (4)$$

where a is the radius of the fiber core (assumed to have a step-index profile);

b is the radius of the glass spacer (assumed to have the same radius as the fiber cladding); and n is the refractive index of the spacer material.

To determine the optimum spacer length for any particular application will depend upon the required spot size. Equation (5) gives the ratio of the spot size diameter s of the image to the fiber core diameter, $2a$, as $$s/2a = F_l|D-F_l| = nR/[(n-n_o)D-nR]. \quad (5)$$

It will be noted, from equation (5), that spot size decreases as D increases. Thus, the smallest spot is obtained when D is equal to its maximum value, as given by equation (4).

Equation (5) aim shows that the image becomes smaller as R decreases. The smallest practical value of R is R=b. For this limit, and using $D_m$ from equation (4), we obtain $$s/2a = b(NA)_f/[(n-n_o)-(b-a)-b(NA)_f] \quad (6)$$

The image appears at a distance d from the lens, in the medium of index $n_o$, given by $$d = n_o DR/[(n-n_o)D-nR]. \quad (7)$$

In a typical embodiment using a pure silica glass spacer having an n equal to 1.457, a radius b equal to 62.5 μm, and a fiber having a core radius of 10 μm and an $(NA)_f$ equal to 0.15, equation (4) yields a maximum spacer length $D_m$ equal to 510 μm. From equation (6), we then obtain a ratio of spot size to object diameter, $s/2a = 0.64$, or a reduction in spot size of one third.

In summary, efficient coupling between multimode optical fibers and optical devices is realized by means of a coupling arrangement comprising a length of homogeneous glass and a convex lens. One end of the glass is spliced onto the end of the multimode fiber. The other end of the glass is terminated by the lens.

What is claimed is:

1. In a multimode optical system, means for coupling optical wave energy between a multimode optical fiber and an optical device comprising:

a length of homogeneous glass spacer spliced, at one end, to said multimode fiber and terminated at its other end by a convex lens having a focal point between said lens and said fiber;

and where the length of said homogeneous glass spacer is greater than the distance between said lens and said focal point.

2. The coupling means according to claim 1 wherein said fiber has a step-index core.

3. The coupler means according to claim 2 wherein the maximum length of said homogeneous glass spacer is given by:

$$D_m = n(b-a)/(NA)_f$$

where n is the refractive index of said homogeneous glass spacer;

$(NA)_f$ is the numerical aperture of said fiber;

a is the radius of said fiber core; and b is the radius of the glass spacer.

4. The arrangement according to claim 2 wherein said coupling means forms a spot of coupled optical energy of size s;

and wherein the ratio of said spot size to the diameter of the fiber core $2a$ is given by:

$$s/2a = F_l|D-F_l| = nR/[(n-n_o)D-nR],$$

where

R is the radius of curvature of the lens;

D is the length of said glass spacer;

$F_l$ is the distance between said lens and said focal point;

n is the refractive index of said glass spacer; and $n_o$ is the refractive index of the region in which the coupled energy is focused.

5. The coupling means according to claim 2 wherein said coupled optical wave energy is focused at a distance d from said lens where $$d=n_o DR/[(n-n_o)D-nR],$$

where $n_o$ is the refractive index of the region in which said energy is focused;

D is the length of said glass spacer;

R is the radius of curvature of the lens; and n is the refractive index of said glass spacer.

* * * * *